United States Patent [19]

Schmidt et al.

[11] 4,350,793
[45] Sep. 21, 1982

[54] FLAME-RETARDANT COMPOSITION OF POLYPHENYLENE ETHER, POLYSTYRENE RESIN AND POLYPHOSPHONATE

[75] Inventors: Manfred Schmidt, New Martinsville, W. Va.; Klaus Reinking, Wermelskirchen, Fed. Rep. of Germany

[73] Assignee: Bayer Aktiengesellschaft, Leverkusen, Fed. Rep. of Germany

[21] Appl. No.: 226,126

[22] Filed: Jan. 19, 1981

[30] Foreign Application Priority Data

Jan. 26, 1980 [DE] Fed. Rep. of Germany ....... 3002792

[51] Int. Cl.³ ..................... C08L 71/04; C08L 85/02
[52] U.S. Cl. ................... 525/133; 525/150; 525/905
[58] Field of Search ............................... 525/133, 150

[56] References Cited

U.S. PATENT DOCUMENTS

| | | | |
|---|---|---|---|
| 3,326,852 | 6/1967 | Thomas | 525/150 |
| 3,383,435 | 5/1968 | Cizek | 525/133 |
| 3,952,072 | 4/1976 | Yonemitsu | 525/133 |
| 3,960,808 | 6/1976 | Katchman | 525/133 |

FOREIGN PATENT DOCUMENTS

| | | |
|---|---|---|
| 2454124 | 5/1975 | Fed. Rep. of Germany . |
| 2909442 | 9/1980 | Fed. Rep. of Germany . |
| 2451386 | 10/1980 | France . |
| 2043083 | 10/1980 | United Kingdom . |

*Primary Examiner*—Paul Lieberman
*Attorney, Agent, or Firm*—Connolly and Hutz

[57] ABSTRACT

A flame-retardant composition comprising a polyphenylene ether and a polystyrene resin in a weight ratio of between 4:1 to 1:4 in admixture with an aromatic thermoplastic polyphonate having a number average molecular weight of 4,000 to 80,000, said thermoplastic polyphosphonate being present in an amount of 1 to 20 parts by weight per 100 parts by weight of the total mixture.

11 Claims, No Drawings

FLAME-RETARDANT COMPOSITION OF POLYPHENYLENE ETHER, POLYSTYRENE RESIN AND POLYPHOSPHONATE

The invention relates to a flame-retardant thermoplastic composition which contains a polyphenylene ether resin, a polystyrene resin and an aromatic polyphosphonate and small amounts of a plasticising compound, such as, for example, a monomeric triaryl phosphate, a cyclic phosphonate or a halogenated hydrocarbon.

Compositions of a polyphenylene ether resin and a polystyrene resin are generally known as industrial thermoplastics which can be processed to shaped articles by extrusion and injection-moulding. Their preparation and use is described, for example, in U.S. Pat. No. 3,383,435.

Such compositions are usually inflammable, especially if they contain a high proportion of a polystyrene resin. The flame-repellancy of such polymer blends is improved, for example, by adding triaryl phosphates (compare U.S. Pat. No. 3,639,506 and German Offenlegungsschrift No. 2,751,496) or cyclic phosphonates (compare German Offenlegungsschrift No. 2,836,771), but the physical properties, such as, in particular, the heat distortion point, of these polymer blends are then drastically impaired.

It has now been found that when a high-molecular thermoplastic polyphosphonate of the type described in German Patent Application P No. 29 44 093.5 is added to a composition of a polyphenylene ether resin and a polystyrene resin a flame-repellant polymer blend results which has a heat distortion point considerably higher than that of a polyphenylene ether/polystyrene resin blend which, instead of the polyphosphonate, contains, for example, an equal amount by weight of a triaryl phosphate.

Flame-retardant compositions which contain (1) a usually inflammable composition of a polyphenylene ether resin and a polystyrene resin, (2) an optionally branched aromatic thermoplastic polyphosphonate with a number-average molecular weight (number-average $\overline{M}_n$) of 4,000 to 80,000 and, if appropriate, (3) small amounts of a plasticising compound, are thus claimed according to the present invention.

Homopolyphosphonates or copolyphosphonates are suitable according to the invention.

The polyphosphonates which are suitable according to the invention consist, according to German Patent Application P No. 29 44 093.5, of recurring units having the structures $$\left[ \begin{array}{c} O \\ \| \\ -P-O-X-O- \\ | \\ R' \end{array} \right] \quad (A)$$

and optionally $$\left[ \begin{array}{c} O \\ \| \\ -P-O-Y-O- \\ | \\ [O]_a \\ | \\ R^2 \\ | \\ [O]_b \end{array} \right] \left[ \begin{array}{c} O \\ | \\ X \\ | \\ O \end{array} \right]_c \quad (B)$$

and (C) in the structures (A) and (B), the end members $-O-\underset{(D)_p}{\underset{|}{\bigcirc}}$ , $-OH$ and $-O-X-OH$ bonded to phosphorus and the end members $-H$, $-\underset{R'}{\overset{O}{\underset{\|}{P}}}-O-\underset{(D)_p}{\underset{|}{\bigcirc}}$ and $-\overset{O}{\underset{\|}{P}}-(O-\underset{(D)_p}{\underset{|}{\bigcirc}})_2$ bonded to oxygen.

The symbols X, D, p and R' are explained below. The proportion of (B), relative to the sum of (A) and (B), can be 0 to 3 mol %, and in the structures (A) and (B):

R' denotes at least one of the radicals $C_1$–$C_{12}$-alkyl, $C_2$–$C_{12}$-alkenyl or $C_6$–$C_{30}$-cycloalkyl, -cycloalkyl, -aryl, -arylalkyl or -arylalkenyl, the particular aryl group being unsubstituted or substituted by 1–5 $C_1$–$C_4$-alkyl groups, X denotes at least one of the radicals phenylene biphenylene $C_1$–$C_4$—alkylenebisphenylene $C_5$–$C_{12}$—cycloalkylenebisphenylene thiobisphenylene oxybisphenylene sulphonylbisphenylene carbonylbisphenylene naphthylene each phenyl nucleus being unsubstituted or substituted by 1-4 $C_1$-$C_4$-alkyl groups and the naphthylene nucleus being unsubstituted or substituted by 1-6 radicals of at least one of the alkyl groups mentioned;

Y denotes a trivalent or tetravalent radical of a trifunctional mononuclear phenol or tri- or tetrafunctional polynuclear phenol, with the free valencies in place of the phenolic hydroxyl groups, and in the case of the polynuclear phenol the aromatic nuclei carrying one or two phenolic hydroxyl groups are linked by aliphatic $C_1$-$C_7$-hydrocarbon radicals or by at least one benzene radical, or Y denotes X if c=0, a=1 and b=1 and at the same time $R^2 = Y'$-$(O-X-O)_c$, or $R^2 = X$, $Y'$ being Y and $c'$ being 1 or 2;

a denotes 0 or the number 1;
b denotes 0 or the number 1;
c denotes 0 or the number 1 or 2, preferably 1 or 2;
$R^2$ denotes $R'$ if a and b are each 0, in which case Y must represent a trivalent or tetravalent radical as defined above, or $R^2$ denotes

if a=1 and b=0, in which case Y must represent a trivalent or tetravalent radical as defined above, or $R^2$ denotes X or $Y'$-$(O-X-O-)_{c'}$ if a and b are each 1;

the symbols D are identical or different and denote $C_1$-$C_4$-alkyl groups and p denotes 0 or a number from 1 to 5, preferably 0.

The definitions of the preceding symbols are preferably as follows:

R' denotes at least one of the radicals methyl or phenyl, in particular methyl;

X denotes at least one of the radicals phenylene, biphenylene or $C_1$-$C_4$-alkylenebisphenylene, it being possible for each phenylene nucleus to be substituted by 1-4 methyl groups, or cyclohexylenebisphenylene, oxybisphenylene, thiobisphenylene or sulphonylbisphenylene, in particular $C_1$-$C_4$-alkylenebisphenylene, it being possible for each phenyl nucleus to be substituted by one or two methyl groups;

Y denotes a trivalent or tetravalent radical of a trifunctional mononuclear phenol or tri- or tetrafunctional polynuclear phenol, with the free valencies in place of the phenolic hydroxyl groups, and in the case of the polynuclear phenol the aromatic nuclei carrying one or two phenolic hydroxyl groups can be linked by aliphatic $C_1$-$C_7$-hydrocarbon radicals or by at least one benzene radical;

a denotes 0 or the number 1;
b denotes 0 or the number 1;
c denotes the number 1 or 2;
$R^2$ denotes $R'$ if a and b are each 0, or $R^2$ denotes

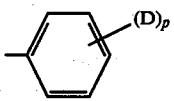

if a=1 and b=0, or $R^2$ denotes X or $Y'$-$(O-X-O-)_{c'}$ if a and b are each 1;

the symbols D are identical or different and denote $C_1$-$C_4$-alkyl groups and p denotes 0 or a number from 1 to 5, in particular 0.

Polyphosphonates which, according to the invention, are suitable and particularly preferred are polymethylphosphonates of bisphenol A, of 4,4'-dihydroxydiphenyl and of hydroquinone.

The thermoplastic aromatic polyphosphonates preferably have average molecular weights (number-average $\overline{M}_n$) of 6,000 to 80,000, in particular 6,000 to 40,000. The molecular weights are determined by the membranosmosis method with the aid of membranes which are permeable to particles with a molecular weight of up to 3,000.

The preparation of the aromatic polyphosphonates which are suitable according to the invention is known in principle; they can preferably be prepared according to the teachings of German Patent Application P No. 29 44 093.5 by the melt transesterification process in the presence of neutral transesterification catalysts, such as titanium tetraalkylates, dialkyl-tin oxides, zirconium tetraalkylates, vanadyl alkylates, dialkyl-dialkoxy-tin compounds or mixtures of germanium dioxide or titanium dioxide and one of the abovementioned catalysts, phosphonic acid diaryl esters being reacted with aromatic diols, if appropriate in the presence of up to 3 mol % of branching triaryl phosphates and if appropriate in the presence of up to 3 mol % of branching aromatic trihydroxy or tetrahydroxy compounds at elevated temperature and in vacuo, with monohydroxyaryls being split off.

The following preparation of polyphosphonates which can be used according to the invention is taken from German Patent Application P No. 29 44 093.5:

105.1 mol of the phosphonic acid diaryl ester, 99.1 mol of the aromatic diol and 0.1 mol of a tetravalent compound containing phenolic OH functional groups are intensively mixed in the presence of $2.27.10^{-3}\%$ by weight (based on 100% by weight of the aromatic diol) of the catalyst at 250° C., under nitrogen. Phenol is distilled off over a column, heated to 100° C., in the course of 3 hours under a vacuum which is intensified from 250 to 100 mbars and at a temperature which is increased from 250° C. to 265° C. The transesterification is then continued for 5 hours under a pressure which is decreased gradually to 0.3 mbar and at an internal temperature which is increased to 310° C., the viscosity of the melt increasing. The autoclave is flushed with nitrogen, the polymer is allowed to settle for 1 hour at 300° C. with the stirrer switched off and the product is isolated by extruding under pressure and granulating the extruded strand.

Preferred compositions according to the invention are those in which the polyphenylene ether resin corresponds to the formula

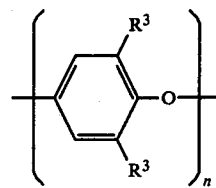

wherein the ether-oxygen atom of a unit is bonded to the benzene nucleus of the next adjacent unit, n is a positive integer of at least 50 and the symbols $R^3$ independently of one another are hydrogen or halogen, such as chlorine or bromine, or monovalent substituents which do not contain a tertiary α-carbon atom and are chosen from the group comprising hydrocarbon radicals, hydrocarbon-oxy radicals, halogenated hydrocarbon radicals and halogenated hydrocarbon-oxy radicals, there being at least 2 carbon atoms between each halogen atom and the phenyl nucleus in the two latter cases.

Particularly preferred resins are those in which $R^3$ represents alkyl with 1–6 carbon atoms, methyl being very particularly preferred.

Examples of polyphenylene ether resins which are suitable according to the invention are

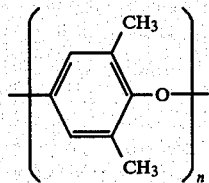

The polyphenylene ether resin in constituent (1) of the composition according to the invention can be prepared by an expert in a known manner, for example according to the teachings of the above-mentioned U.S. Pat. No. 3,383,435 and in accordance with the methods in the literature references mentioned. These materials are also commercially available.

The intrinsic viscosities of polyphenylene ether resins which can be used according to the invention are between 0.15 and 0.98 deciliters per gram (dl/g), measured in chloroform at 30° C.

Preferred compositions according to the invention are also those in which the polystyrene resin contains at least 25% by weight, in particular 20 to 80% by weight, of units derived from a compound of the formula

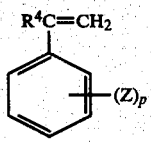

wherein
$R^4$ represents hydrogen, alkyl with 1 to 6 carbon atoms or halogen (such as chlorine or bromine),
Z is vinyl, halogen (such as chlorine or bromine) or lower alkyl with 1–4 C atoms and
p is 0 or an integer which is at most equal to the number of replaceable hydrogen atoms on the benzene nucleus of this formula.

Polystyrene resins of this type in which p is 0 and $R^4$ represents hydrogen are preferred. Typical styrene resins include, for example, homopolymers, such as polystyrene and polychlorostyrene, modified polystyrenes, such as rubber-modified polystyrenes (polystyrenes of high impact strength), and styrene-containing copolymers, such as styrene/acrylonitrile copolymers (SAN), styrene/butadiene copolymers, styrene/ether-/propylene/butadiene terpolymers (EPDM), styrene-/maleic anhydride copolymers (SMA), styrene/acrylonitrile/α-alkyl-styrene copolymers and styrene/acrylonitrile/butadiene terpolymers (ABS), poly-α-methylstyrene and copolymers of ethylvinylbenzene and divinylbenzene.

Such polystyrene resins which are suitable according to the invention can be prepared in a known manner, for example according to German Offenlegungsschrift No. 2,246,713, page 19.

They have weight-average molecular weights of between 100,000 and $10^6$.

The nature of the polyphosphonate in constituent (2) which is used for the preparation of the flame-repellant composition according to the invention is not critical. However, polymethylphosphonates and polyphenylphosphonates based on bisphenol A, hydroquinone, resorcinol, 4,4′-dihydroxydiphenyl and 4,4′-dihydroxydiphenyl sulphone are preferably used.

The flame-repellant compositions according to the invention can be prepared, for example, by premixing the individual polymer components, melting the mixture in a suitable extruder and extruding the homogenised melt. In another method, a premix which is a polyphosphonate/polyphenylene oxide resin/polystyrene resin blend with a high polyphosphonate content is prepared. This premix can be added to the polyphenylene oxide resin/polystyrene resin mixture in order to prepare a composition according to the invention with a desired concentration of polyphosphonate. The extrusion temperature can vary between 230° C. and 320° C., the temperature being in each case somewhat influenced by the particular composition.

The strands issuing from the extruder can be cooled and granulated and the granules can then be processed to shaped articles.

The concentration of the flame-retardant polyphosphonate constituent (2) can vary, but is largely dependent on the concentration of the polystyrene resin and on the polystyrene resin used in a particular case. Lower concentrations of the polystyrene resin or a lower flammability of the polystyrene resins require a lower concentration of polyphosphonate. In general, however, amounts of 1 to 20 parts by weight of constituent (2) per 100 parts by weight of the total mixture of constituents (1) and (2) are used. In order to guarantee the considerable advantages, however, it is expedient to employ 2 to 15 parts by weight of constituent (2) per 100 parts by weight of the combined constituents (1) and (2).

The weight ratio of polyphenylene ether resin to polystyrene resin in constituent (1) is between 4:1 and 1:4.

Mixtures of polyphenylene ether resin and polystyrene resin which can be used as constituent (1) according to the invention are also described in U.S. Pat. No. 3,383,435.

Conventional additives, that is to say additives which are known for polyphenylene ethers and polystyrene resins, for example reinforcing agents, pigments, stabilisers, lubricants and plasticisers, can also be added in conventional amounts.

Examples of suitable plasticising compounds are triaryl phosphates, cyclic phosphonates or halogenated hydrocarbons, in amounts of 0.5 to 6% by weight, in particular in amounts of 1 to 4% by weight, in each case relative to the total weight of constituents (1) and (2) in the composition according to the invention.

Some of the plasticising additives can themselves partly contribute to the flame-repellancy of the compositions according to the invention.

For example, triaryl phosphates having the general structure

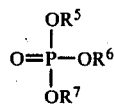

wherein $R^5$, $R^6$ and $R^7$ are identical or different and can be aryl, alkyl-substituted aryl or hydroxyaryl, which are known from the literature can be used in the amounts indicated (in this context, see also German Offenlegungsschrift No. 2,751,496). Examples of suitable phosphates are triphenyl phosphate, diphenyl cresyl phosphate and tricresyl phosphate.

Cyclic phosphonates having the general structure

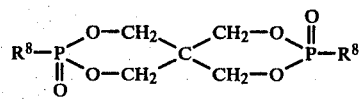

wherein $R^8$ represents a $C_1$ to $C_{18}$-alkyl radical or an aryl or alkylaryl radical, which are known from the literature are also suitable as plasticising additives when used in the amounts indicated (in this context, see also German Offenlegungsschrift No. 2,916,972). Examples of suitable cyclic phosphonates are

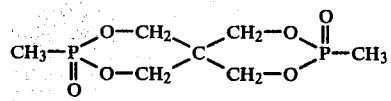

Chlorinated paraffins can furthermore be used, in the amounts indicated, as plasticising additives which simultaneously have a flame-retardant effect (in this context, see also German Offenlegungsschrift No. 2,751,1496).

The compositions according to the invention can also contain other flame-retardant additives, such as, for example, calcium carbonate or antimony trioxide, whereupon the flame-retardant effect of the polyphosphonate component of the blend can additionally also be intensified.

Compared with polyphenylene oxide resin/polystyrene resin blends which are rendered flame-repellant in the customary manner with triaryl phosphates, the polyphenylene oxide resin/polystyrene resin blends according to the invention which have been mixed with an amount by weight of polyphosphonate which corresponds to the amount of triaryl phosphate have a considerably higher heat distortion point (measured by determining the Vicat B temperature in accordance with the method of DIN 53,460), whilst at the same time having equally good fire-repellancy properties.

The hardness was determined by measuring the ball indentation hardness HB in accordance with the method of DIN 53,456. The mechanical-elastic properties were examined by stress/strain tests, such as by measuring the tensile strength $\sigma_T$ and the elongation at break $\epsilon_T$ in accordance with the method of DIN 53,455 (1968) and by measuring the flexural E modulus and the tensile E modulus in accordance with the method of DIN 53,457.*

*The impact strength $a_n$ and the notched impact strength $a_k$ were measured by the method of Charpy in accordance with DIN 53,453, 10 test pieces being used in each case.

The fire-repellancy was tested by measuring the after-burn time in accordance with the UL test (Subj. 94). For this, test rods having the dimensions: 127×12.7×1.6 mm (1/16″) and 127×12.7×3.2 mm (⅛″) were subjected to the test method of Underwriters Laboratories, Inc. Bulletin 94, Burning Test for the Classification of Materials.

According to this test method, the materials tested in this way were classified as UL-94 V-O, UL-94 V-I or UL-94 V-II, and in particular on the basis of results obtained with 10 samples. The criteria for each of these V classifications according to UL-94 are briefly as follows:

UL-94 V-O: The average period of flaming and/or smouldering after removal of the igniting flame should not exceed 5 seconds, and none of the samples should drip particles which ignite absorbent cotton.

UL-94 V-I: The average period of flaming and/or smouldering after removal of the igniting flame should not exceed 25 seconds, and none of the samples should drip particles which ignite absorbent cotton. UL-94 V-II: The average period of flaming and/or smouldering after removal of the igniting flame should not exceed 25 seconds, and the samples drip flaming particles which ignite absorbent cotton.

Furthermore, a test rod which burned for more than 25 seconds after removal of the igniting flame was not classified according to UL-94, but was designated "burns" under the standard conditions of the present invention. The UL-94 specification moreover requires that all test rods of an experiment must fulfil the particular V evaluation, otherwise the 10 test rods are given the classification of the poorest individual rod. If, for example, 1 rod is evaluated as UL-94 V-II and the other 9 test rods are evaluated as UL-94 V-O, all 10 rods receive the classification UL-94 V-II.

The compositions, according to the invention, of a polyphenylene ether resin, a polystyrene resin, a polyphosphonate and a plasticising additive are pre-mixed and extruded at 270° C. and the extruded material is comminuted to granules. The granules are extruded at 260° C. in the injection-moulding process. The physical properties and the results of the burning test for these materials and for the comparison materials are compared in the table in the following text.

COMPARISON EXAMPLE 1

A polymer blend of 50% by weight of poly-(2,6-dimethyl-1,4-phenylene) ether (PPO resin from Messrs. General Electric Co., USA) and 50% by weight of a polystyrene resin (FG 834, rubber-modified polystyrene from Messrs. Foster Grant Co., USA) was tested for comparison. This polymer blend is called blend A. The processing temperature in the extruder is 260° C.

COMPARISON EXAMPLE 2

90 parts by weight of blend A and 10 parts by weight of phenyl dicresyl phosphate ("Disflamoll DPK" from Messrs. Bayer AG) are homogeneously mixed, the mixture is extruded at 260° C. and the extruded material is tested. This polymer composition is called blend B.

EXAMPLE 1

90 parts by weight of blend A and 10 parts by weight of a polymethylphosphonate based on 4,4'-dihydroxydiphenyl are homogeneously mixed, the mixture is extruded at 260° C. and the extruded material is tested. The polymethylphosphonate was prepared according to Example 1 of German Patent Application P 29 44 093.5 and has a relative solution viscosity $\eta_{rel}$ of 1.316 (measured at 25° C. in 0.5% strength by weight solution in methylene chloride) and a number-average molecular weight $\overline{M}_n$ of 26,700. The polymer composition thus obtained is called blend C.

EXAMPLE 2

90 parts by weight of blend A are homogeneously mixed with 10 parts by weight of a polymethylphosphonate based on 2,2-bis-(4-hydroxyphenyl)-propane (=bisphenol A), the mixture is extruded at 260° C. and the extruded material is tested. This polymethylphosphonate was prepared according to Example 9 of German Patent Application P No. 29 44 093.5 and has a relative solution viscosity $\eta_{rel}$ of 1.280 and a number-average molecular weight $\overline{M}_n$ of 22,000. The polymer composition thus obtained is called blend D.

EXAMPLE 3

90 parts by weight of blend A are homogeneously mixed with 6.5 parts by weight of a polymethylphosphonate which is based on 4,4'-dihydroxydiphenyl and has a $\overline{M}_n$ of 26,700 and with 3.5 parts by weight of phenyl dicresyl phosphate, as a plasticising additive, the mixture is extruded at 270° C. and the extruded material is tested.

EXAMPLE 4

A blend of 90 parts by weight of blend A, 5 parts by weight of polymethylphosphonate which is based on 4,4'-dihydroxydiphenyl and has a $\overline{M}_n$ of 26,700 and 5 parts by weight of phenyl dicresyl phosphate was prepared analogously to the composition in Example 3.

EXAMPLE 5 90 parts by weight of blend A, 7.5 parts by weight of a polymethylphosphonate which is based on 4,4'-dihydroxydiphenyl and has a $\overline{M}_n$ of 26,700 and 2.5 parts by weight of chlorinated paraffin wax are homogeneously mixed, the mixture is extruded at 260° C. and the extruded material is tested.

EXAMPLE 6

90 parts by weight of blend A, 6.5 parts by weight of a polymethylphosphonate which is based on 2,2-bis-(4-hydroxyphenyl)-propane (=bisphenol A) and has a number-average molecular weight $\overline{M}_n$ of 22,000 and 3.5 parts by weight of phenyl dicresyl phosphate are homogeneously mixed, the mixture is extruded at 260° C. and the extruded material is tested.

EXAMPLE 7

90 parts by weight of blend A, 7.5 parts by weight of a polymethylphosphonate which is based on bisphenol A and has a number-average molecular weight $\overline{M}_n$ of 22,000 and 2.5 parts by weight of the bicyclic phosphonate having the following structure

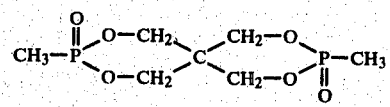

are mixed homogeneously, the mixture is extruded at 260° C. and the extruded material is tested.

| Comparison table | Blend A Comparison Example 1 | Blend B Comparison Example 2 | Blend C Example 1 | Blend D Example 2 |
|---|---|---|---|---|
| Impact strength $a_n$ (kJ/m²) | 6 × n.b./100* | 6 × n.b./87 | 14 | 14 |
| Notched impact strength $a_k$ (kJ/m²) | 11 | 11 | 3.6 | 5 |
| Ball indentation hardness HB (N/mm²) | 119 | 117 | 122 | 125 |
| Flexural strength (MPa) at 3.5% edge fiber elongation | 79 | 69 | 77 | 79 |
| Flexural E modulus (MPa) | 2,800 | 2,630 | 2,880 | 2,890 |
| Tensile strength $\sigma_T$ (MPa) | 52 | 47 | 54 | 54 |
| Elongation at break $\epsilon_T$ (%) | 44 | 33 | 3 | 3 |
| Tensile E modulus (MPa) | 2,470 | 2,390 | 2,520 | 2,550 |
| Vicat B temperature (°C.) | 136 | 100 | 135 | 133 |
| Iso-R-75 (method A) (°C.) | 122 | 88 | 121 | 118 |
| UL-94 (1/16") | failed | V-1 | V-1 | V-1 |
| UL-94 (⅛") | " | V-0 | V-0 | V-0 |

*n.b. = not broken

We claim:

1. Flame-retardant composition, characterised in that it contains (1) a usually inflammable composition of a polyphenylene ether resin and a polystyrene resin, (2) an optionally branched aromatic thermoplastic polyphosphonate with a number-average molecular weight of $\overline{M}_n$ of 4,000 to 80,000, the constituent (2) being employed in amounts of 1 to 20 parts by weight per 100 parts by weight of the total mixture of (1) and (2), and (3) small amounts of a plasticising compound.

2. Composition according to claim 1, characterised in that the aromatic polyphosphonate (2) is an aromatic polymethylphosphonate.

3. Composition according to claim 1, characterised in that the polyphenylene ether resin corresponds to the formula

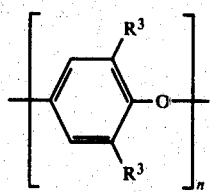

wherein
the ether-oxygen atom of a unit is bonded to the benzene nucleus of the next adjacent unit, n represents a positive integer of at least 50 and the $R^3$ radicals, independently of one another, are chosen from the group comprising hydrogen, halogen and monovalent substituents which do not contain a tertiary α-carbon atom, and are chosen from the group comprising hydrocarbon radicals, hydrocarbon-oxy radicals, halogenated hydrocarbon radicals and halogenated hydrocarbon-oxy radicals, there being at least 2 carbon atoms between the halogen atom and the phenyl nucleus in the two latter cases.

4. Composition according to one of the preceding claims, characterised in that it contains the polystyrene resin to the extent of 20 to 80 parts by weight per 100 parts by weight of constituent (1).

5. Composition according to one of the preceding claims, characterised in that the polystyrene resin contains at least 25% by weight of units which are derived from the formula

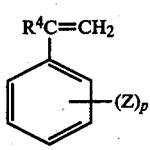

wherein
$R^4$ represents hydrogen, alkyl with 1 to 6 carbon atoms or halogen,
Z is vinyl, halogen or lower alkyl and
p is 0 or an integer which is at most equal to the number of replaceable hydrogen atoms on the benzene nucleus of this formula.

6. Composition according to claim 5, characterised in that the polystyrene resin is a styrene homopolymer resin.

7. Composition according to one of the preceding claims, characterised in that the amount of constituent (2) is 2 to 15 parts by weight per 100 parts by weight of the combined constituents (1) and (2).

8. Composition according to claims 1 to 7, characterised in that it contains 0.5 to 6% by weight, relative to the total weight of constituents (1) and (2), of a plasticising compound.

9. Composition according to claim 8, characterized by the plasticizing compound being a monomeric aromatic phosphate.

10. Composition according to claim 8 characterized by the plasticizing compound being phenyl-dicresyl phosphate.

11. Composition according to claim 1 wherein the polyphosphonate constituent (2) has the recurring structural units (A)

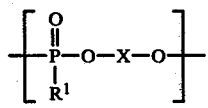
(A)

and 0 to 3 mole % of units (B) based on the sum of (A) and (B) wherein (B) is

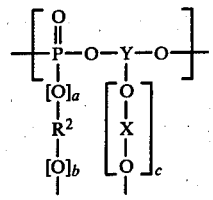
(B)

and (C) end members

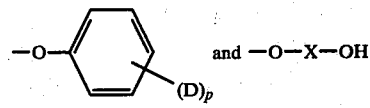

bonded to phosphorus and end members

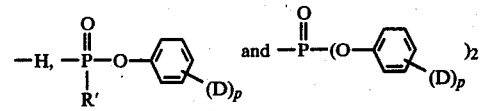

bonded to oxygen; wherein
$R^1$ is $C_1$ to $C_{12}$-alkyl, $C_2$ to $C_{12}$-alkenyl or $C_6$ to $C_{30}$-cycloalkyl, -cycloalkenyl, aryl, -arylalkyl or -arylalkenyl, with the particular aryl group being unsubstituted or substituted by one to five $C_1$ to $C_4$-alkyls;
X is phenylene, biphenylene, $C_1$ to $C_4$-alkylenebisphenylene, $C_5$ to $C_{12}$-cycloalkylenebisphenylene, thiobisphenylene, oxybisphenylene, sulphonylbisphenylene, carbonylbisphenylene or naphthylene with each phenyl nucleus being unsubstituted or substituted by one to four $C_1$ to $C_4$-alkyls and the naphthylene nucleus being unsubstituted or substituted by one to six $C_1$ to $C_4$ alkyls;
Y is a trivalent or tetravalent radical of a trifunctional mononuclear phenol or tri- or tetra-functional polynuclear phenol, with the free valencies replacing the phenolic hydroxyl groups, and in the case of the polynuclear phenol, the aromatic nuclei having one or two phenolic hydroxyl groups are linked by aliphatic $C_1$ to $C_7$-hydrocarbon moities or by at least one benzene radical, or Y has the meaning of X when c is zero, a is 1 and b is 1 at the same time $R^2$ is $Y^1$ $+O-x-O)_{c'}$ and X and $Y^1$ is the same as Y and C' is 1 or 2;
a is zero or the number 1;
b is zero or the number 1;
c is zero or the number 1 or 2;
$R^2$ is the same as $R^1$ if a and b are each zero, in which case Y must be a trivalent or tetravalent radical as defined above, or $R^2$ is

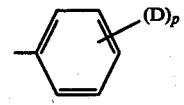

if a is 1 and b is zero, in which case Y must be a trivalent or tetravalent radical as defined above, or $R^2$ denotes X or $Y'$ $+O-X-O)_{c'}$ if a and b are each 1;
D represents the same or different $C_1$ to $C_4$ alkyl moieties; and
p is zero or a whole number from 1 to 5.

* * * * *

UNITED STATES PATENT AND TRADEMARK OFFICE
CERTIFICATE OF CORRECTION

PATENT NO. : 4,350,793                                  Page 1 of 2

DATED : September 21, 1982

INVENTOR(S) : Manfred Schmidt et al

It is certified that error appears in the above-identified patent and that said Letters Patent is hereby corrected as shown below:

In Column 10, before Patent Claims, please insert the attached Examples 3 to 7.

*Signed and Sealed this*

*Twenty-first* Day of *June 1983*

[SEAL]

*Attest:*

DONALD J. QUIGG

*Attesting Officer*    *Acting Commissioner of Patents and Trademarks*

Comparison table

| | Example 3 | Example 4 | Example 5 | Example 6 | Example 7 |
|---|---|---|---|---|---|
| Impact strength $a_n$ (kJ/m²) | 7×n.b.*)/90 | 6×n.b./100 | 6×n.b./100 | 83 | 6×n.b./90 |
| Notched impact strength $a_k$ (kJ/m²) | 10 | 10 | 10 | 8 | 10 |
| Ball indentation hardness HB (N/mm²) | 122 | 126 | 121 | 129 | 122 |
| Flexural strength (MPa) at 3.5% edge fibre elongation | 79 | 81 | 79 | 80 | 80 |
| Flexural E modulus (MPa) | 3,030 | 2,940 | 3,020 | 2,920 | 3,010 |
| Tensile strength $\sigma_T$ (MPa) | 52 | 49 | 52 | 50 | 53 |
| Elongation at break $\varepsilon_T$ (%) | 31 | 37 | 22 | 25 | 24 |
| Tensile E modulus (MPa) | 2,590 | 2,570 | 2,590 | 2,580 | 2,600 |
| Vicat B temperature (°C) | 122 | 116 | 127 | 122 | 127 |
| Iso-R-75 (method A) (°C) | 107 | 104 | 109 | 106 | 109 |
| UL-94 (1/16") | V-1 | V-1 | V-1 | V-1 | V-1 |
| UL-94 (1/8") | V-0 | V-0 | V-0 | V-0 | V-0 |

\* n.b. = not broken

UNITED STATES PATENT AND TRADEMARK OFFICE
CERTIFICATE OF CORRECTION

PATENT NO. : 4,350,793
DATED : September 21, 1982
INVENTOR(S) : Manfred Schmidt et al It is certified that error appears in the above-identified patent and that said Letters Patent is hereby corrected as shown below:

Column 2, line 33, change "-cycloalkyl" (second occurrence) to -- -cycloalkenyl --.

Column 11, claim 11, in formula (A), change "$R^1$" to --R'--.

Column 12, line 27, change "$R^1$" to --R'--.

Signed and Sealed this

Eighth Day of November 1983

[SEAL]

Attest:

GERALD J. MOSSINGHOFF

Attesting Officer    Commissioner of Patents and Trademarks